(12) United States Patent
Lu et al.

(10) Patent No.: US 11,279,453 B2
(45) Date of Patent: Mar. 22, 2022

(54) WIND-WATER MACHINE SET

(71) Applicants: Cheng-Chung Lu, New Taipei (TW); Tien Hua Lin, New Taipei (TW)

(72) Inventors: Cheng-Chung Lu, New Taipei (TW); Tien Hua Lin, New Taipei (TW)

( * ) Notice: Subject to any disclaimer, the term of this patent is extended or adjusted under 35 U.S.C. 154(b) by 0 days.

(21) Appl. No.: 16/882,753

(22) Filed: May 26, 2020

(65) Prior Publication Data

US 2021/0371060 A1   Dec. 2, 2021

(51) Int. Cl.
| | | |
|---|---|---|
| *B63B 39/08* | (2006.01) | |
| *B63B 79/40* | (2020.01) | |
| *B63B 1/34* | (2006.01) | |
| *B63H 25/00* | (2006.01) | |
| *F03B 13/10* | (2006.01) | |
| *F03B 7/00* | (2006.01) | |
| *B63H 11/103* | (2006.01) | |
| *B63H 11/09* | (2006.01) | |
| *B63H 11/00* | (2006.01) | |

(52) U.S. Cl.
CPC ............. *B63B 39/08* (2013.01); *B63B 1/34* (2013.01); *B63B 79/40* (2020.01); *B63H 11/09* (2013.01); *B63H 11/103* (2013.01); *B63H 25/00* (2013.01); *F03B 7/00* (2013.01); *F03B 13/10* (2013.01); *B63B 2001/345* (2013.01); *B63H 2011/008* (2013.01)

(58) Field of Classification Search
CPC ........ B63B 39/00; B63B 39/08; B63B 79/40; B63B 1/00; B63B 1/34; B63B 2001/345; B63H 11/00; B63H 11/09; B63H 11/103; B63H 25/00; B63H 25/46; B63H 2011/008; F03B 7/00; F03B 13/00; F03B 13/10

USPC .................................................. 440/5, 40, 47
See application file for complete search history.

(56) References Cited

U.S. PATENT DOCUMENTS

| | | | | |
|---|---|---|---|---|
| 3,675,611 A | * | 7/1972 | Glass ...................... | B63H 25/46 440/40 |
| 5,289,793 A | * | 3/1994 | Aker ...................... | B63H 11/08 440/38 |
| 6,142,841 A | * | 11/2000 | Alexander, Jr. ........ | B63H 11/08 440/38 |
| 10,428,786 B2 | * | 10/2019 | Navarro .................. | F03B 13/00 |
| 2013/0040513 A1 | * | 2/2013 | Lin ...................... | B63H 11/103 440/40 |

* cited by examiner

*Primary Examiner* — Lars A Olson
(74) *Attorney, Agent, or Firm* — Raymond Chan

(57) ABSTRACT

A wind-water machine set is an evolving jet machine that moves the internal engine to the outside of the sleeve to work, instead of using a water jet as the main and air-jet as the auxiliary. When a ship uses multiple groups of wind-water machine set, there is a master control center for overall control and coordinated operation. Controlling the propulsion system makes the ship move forward and backward in an orderly manner. Control the surfing system to eliminate the bow water resistance and cooperate with the propulsion system. The steering control system is controlled to make the ship easy to operate the steering. Control the balance system to keep the ship balanced without swaying the roll angle. Control the draught system so that ships do not need ballast water. So that the ship can sail at super high speed, super fuel-efficient and safe.

2 Claims, 10 Drawing Sheets

WIND-WATER MACHINE SET

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

This is an invention developed and researched by a group of practitioners (retired Taiwan seafarers and first-class chief engineers) since 41 years ago.

The invention relates to a wind-water machine because it can easily increase the water pressure, greatly increase the flow speed of wind-water flow and amplify the output kinetic energy thousands of times.

With this powerful power, it can be used as the main engine power Besides, it can also eliminate water resistance, maintain the balance of the ship, enable quick control of the movement of the ship, and reduce the use of the ship's draft. Furthermore, because it can greatly increase the flow speed of the water flow, it can make the hydroelectric generator produce more than one hundred times of the electricity than a conventional device! Accordingly, it can even prevent the Mississippi River from flooding in the future because the speed of the water flow of the river can be accelerated for dozens of times.

The crew can thus achieve easy, super fuel efficient, super high speed and super high safety navigation. And make the world of tomorrow better.

Description of Related Arts

Conventionally, engines are made according to the power application formulas of $F=MA/E=MC^2$.

An aircraft engine uses high-grade aircraft fuel is in a very high-temperature environment, uses high-temperature-resistant precision machinery, operates at a super high speed (e.g. 40,000 revolutions per minute), and sprays air backward at the highest speed possible.

For the propeller of the ship, although the diameter of the propeller is maximized to discharge the maximum water flow, in order to prevent cavitation, it can only push the water backward at a low speed of only about 100 revolutions per minute. Therefore, although the mass of water flow propelled by a ship is 775 times heavier than that of air, the flow rate of water flow is 1/3000 than that of air. Therefore, although the marine machinery does not need to be as precise as an aircraft, nor does it need to withstand high temperatures, the method of using the power for the ship is also extremely poor.

As we all know, due to the huge water-resistance of water flow, rifle bullets with huge kinetic energy fired in the water can only freely fall to the ground after shooting for one meter in the water.

There is another phenomenon that has clearly aroused the interest in studying wind-water machines. When a person seals the air inlet of a massage bathtub, the water flow in the bathtub is almost still! After opening the seal, the water flow in the massages bathtub will hit the human body at a high speed. Adding air alone makes the water flow quickly and the kinetic energy increases dramatically. If the use of compressed air and/or high-pressure water column is to pressurize the water flow, the effect of amplifying kinetic energy is bound to be obtained.

Traditionally, when ships use propellers or water jets, cavitation must be avoided to prevent the water in front of the propeller from not being fully supplied to the propeller. When the saturated vapor pressure of the water supply pressure decreases, the water evaporates into bubbles. Once the bubble bursts, a water hammer will occur, which will produce an impact force of 49 mPa, which will seriously damage the surface of the propeller blade. Due to $E=MC^2$, currently, the ship can only increase the diameter of the propeller, and the speed of the main engine cannot be increased under the limitation of the pumping/discharging speed $C^2$. At present, the mass (M) has increased to the maximum. Since the speed C cannot be increased, the power output efficiency of the ship is extremely poor and limited.

When Mr. Lu Cheng Chung, one of the applicants, took over a new ship "Asia Breeze", the ship was hit by three super typhoons on one route 40 degrees of North Atlantic in one week. After inspection, it was found that all high-pressure elastic steel plates on the waterline were recessed and deformed, thereby exposing the ribs. However, the steel plate below the waterline was not injured as new. Later, through observation formulas and experimental data of ship models, it was found that when a super typhoon carried raindrop falling at a high altitude, the extremely high energy generated by the super-typhoon hit the hull at an extremely high speed. The hull steel plate below the waterline is only affected by the waves, at normal water speeds, its strength is not great enough to deform the hull. Therefore, we intentionally add materials to mimic their functions. Not only high-pressure compressed air is used, but also high-pressure water column spray is used to impinge on the water flow several times so that the entrained wind-water flow is pushed outward with super high speed with huge kinetic energy. Compared with the case where the low-speed water current is usually used as power, the fuel rate can be reduced to a value below 2%, and when the flow speed is increased for ten times, the energy can be increased for hundreds of times.

Conventionally, steering gear has been used on ships to steer the ship's direction until recently. But it is useful only when ship sailing at high speed. When the ship is at medium or low speed, the situation of out of control is obvious. Therefore, when entering any port, almost all ships need to be escorted by the tugboat to maintain the route. Even when a dangerous chemical ship was alongside in port, the applicant encountered sudden strong offshore wind several times, and the mooring ropes broke and fail to hold the ship. There are no ports in the world that have enough tugboats to rescue all in-port ships in this kind of situation. For safety, therefore, every ship needs the ability to "move left/right laterally" by itself. To make matters worse, the use of recently steering gear can cause the ship to tilt heavily. Therefore, many heavily loaded ships and even passenger ships capsized in the typhoon because they needed to turn at the turning point of the shipping route. Without high speed, the ship has no steering power, so it cannot maintain the route to sail, and it cannot turn fast to face the typhoon wind direction, which causes great danger to the life of the crews and passengers. Accordingly, many Taiwan captains & chief engineers felt calling 41 years ago and finally come up with a solution.

All in all, it is necessary to create a wind-water machinery to change the traditional method of kinetic energy use. For current ships that cannot increase the displacement of the propeller, the present invention provides a bell mouth to reduce the outlet diameter and flow to increase the outlet pressure and flow speed, so that the water flow is increased to high pressure and high speed, surrounded by the tube casing, and accelerated in the air environment, using air and various compressed air and/or high-pressure water column or sprayer, and multiple high-pressure water impacts, so as to be carried thereby to become a super-high-speed wind-water stream sprayed out, and obtain several thousand times of energy. This is just like the propeller plane entering the jet age. Trying to increase the fluid discharge speed as much as possible, and it has a huge kinetic energy impact, which makes the aircraft enter the jet era, and even into the supersonic era. The high-pressure wind-water column is impacted by the high-pressure water jet in the air in the sleeve, and is sprayed outward at high speed, and is injected into the air (or water stream). Due to the incompressible nature of water, it is easy to increase the pressure (flow rate) by a factor of one hundred, and obtain ultra-high energy (M $C^2$ kinetic energy), and then use high-pressure compressed air (air velocity is 3000 times than liquid velocity), so the high-speed wind-water flow can be ejected from the sleeve at a very high speed, forming thousands of times of the kinetic energy. This particularly cheap and huge clean energy is what the inventors want to provide by the present invention.

SUMMARY OF THE PRESENT INVENTION

The present invention aims to provide the wind-water machine and its various uses.

Each wind-water machine uses one or more air, compressed air, and high-pressure high-speed water flow in the sleeve to impact outwards. Based on the kinetic energy formula: $F=MA/E=C^2$, it is able to obtain a cheap, huge, and clean kinetic energy of the square times of its speed and uses it in all places requiring kinetic energy, such as:

1. the main engine used for the main propulsion systems;
2. the surfing system, since the wind-water machine power hits the water flow in front of the bow of the ship so that the resultant current force can be directed to the bottom or both sides of the ship without hitting the hull;
3. a steering gear, so that it can quickly control the direction of the ship;
4. a balancing system to avoid rolling and/or pitching anytime;
5. to reduce the draught of ships not only for save fuel consumption, but also for safety, so that ships in the world will never overturn again in the future;
6. to let the current hydroelectric generator get the power generated by the square multiple of the extra flow rate due to the increase in the speed of the incoming water; and
7. to let the big rivers of the world never flood again by having the water flow fast for more than ten times than usual.

Thereby the wind-water machine of the present invention can provide ultra-safe, high-speed, comfortable, and super-powerful, fuel-efficient navigation. In order to achieve the above and other objects, the present invention provides a wind-water machine set for ship. The wind-water machine set in a ship includes a master control center, one or more propulsion systems, one or more surfing systems, one or more steering control systems, one or more balancing systems, and one or more draft reducing systems.

The master control center is located at the inner side of the ship. The propulsion system is in the ship and is connected to the master control center for supplying a small number of water flows and serving as a power system. The surfing system is located at the bottom sea chest of the ship and is connected to the master control center and the propulsion system. The surfing system has a plurality of water acceleration tube and is capable of pumping water from a bow sea chest of the ship and spraying water from a ship bow to a ship bottom, portside and starboard side. The steering control system is located at the outer side of the ship and is connected to the master control center to replace a steering engine so that the ship can be manipulated more easily. The balancing system is located at the outer side of the ship and is connected to the master control center to keep the ship in balance without swaying rolling and pitching. The draft reducing system is located at the outer side of the ship and is connected to the master control center so that the ship does not require ballast water and can even float in the air when water tanks had enough water for ultra-high-speed jet out.

In the exemplary embodiment, the named "typhoon ship" is also provided with an air injection pipes, which is arranged at the stern end of the ship to eliminate the pinch and pull of stern trail caused by the high-speed sailing of the ship.

The propulsion system has at least one bell mouth or at least one sleeve for reducing an outlet diameter of water flow, and then spraying impinging on the water flow one or more times, and using air, compressed air of various pressures, and a high-pressure water splash, in order to prolong an action time of a counterforce, to spray the wind-water flow backward at an ultra-high-speed, and to obtain maximum propulsion energy.

In an exemplary embodiment, the wind-water machine set of the present invention may also be applied to a hydroelectric generator. The wind-water machine set is settled in front of the hydroelectric generator. A bell mouth is used to reduce water volume and increase outlet pressure and speed. A sleeve is used to accelerate a water flow speed in the air environment. One or more streams of compressed air or high-pressure spray are used to accelerate the water flow speed through impinging. Then a nozzle with a reduced diameter is used to impinge on a hydroelectric generator water wheel at a high speed to increase a generating capacity of a hydroelectric generator. A tailwater spraying out impinges on an air compressor water wheel to generate compressed air for the wind-water machine to function. Another tailwater is used to impinge on a high-pressure water pump wheel to generate a high-pressure spray column for the wind-water machine to function.

DETAILED DESCRIPTION OF THE PREFERRED EMBODIMENT

Figure 1:
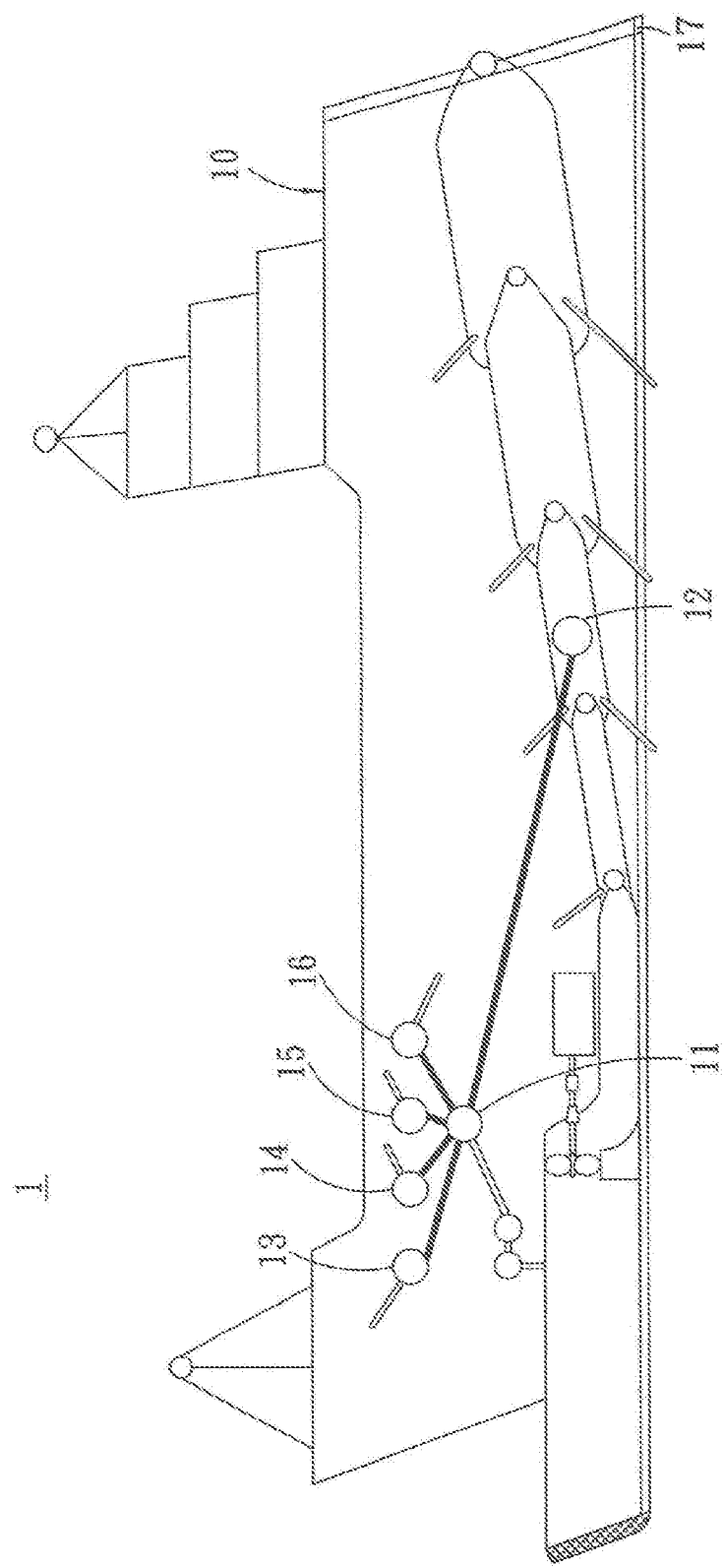
FIG. 1 is a schematic structural side view of a wind-water machine set according to a first exemplary embodiment of the present invention.

The following is a description of implementations of the present invention through specific embodiments. Those skilled in the art can easily understand other advantages and effects of the present invention from the content disclosed in this specification.

The following describes the embodiments of the present invention with reference to the drawings. It should be noted that the following drawings are simplified schematic drawings and are merely used for illustrating the basic idea of the present invention in a schematic way. Only the structures related to the present invention are illustrated in the drawings. The drawings are not drawn according to the number, shape, and size of components during actual implementation. The form, number, and scale of components during actual implementation are not limited to those shown in the drawings and can be changed according to the actual design requirements.

Figure 2A:
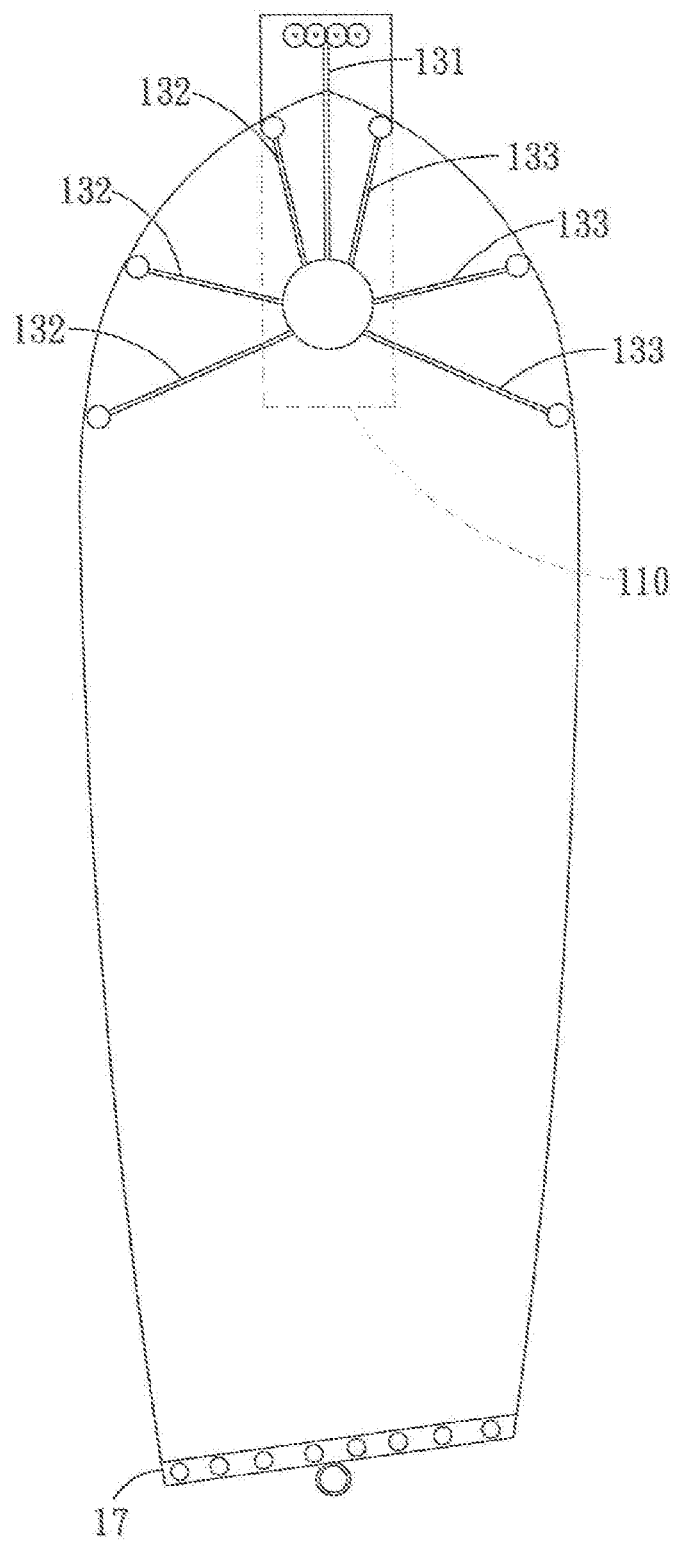
FIG. 2A is a schematic structural overlook view of a surfing system of the wind-water machine set according to the first exemplary embodiment of the present invention.
Figure 2B:
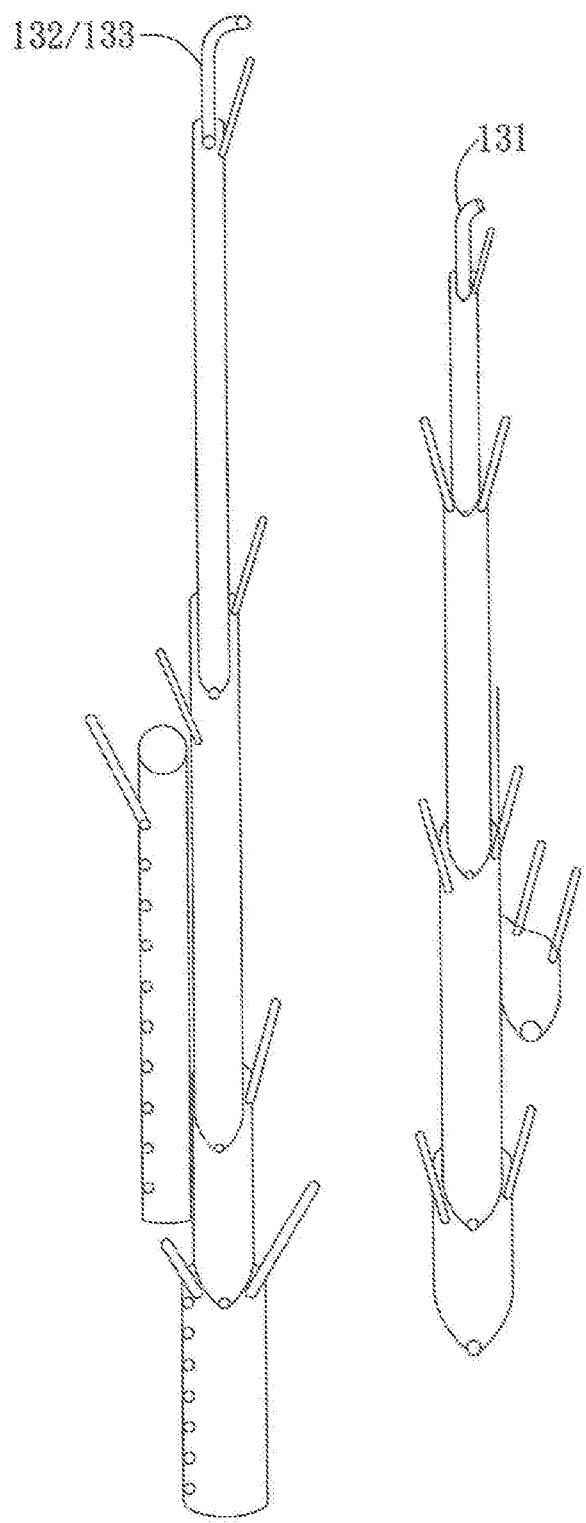
FIG. 2B is a schematic structural side view of the surfing system of the wind-water machine set according to the first exemplary embodiment of the present invention.

First, referring to FIG. 1 which is a schematic structural side view of a wind-water machine sets according to a first exemplary embodiment of the present invention, one may find all wind-water machine sets 1 inside. FIG. 2A is a schematic structural overlook view of a surfing system of the wind-water machine set according to the first exemplary embodiment of the present invention, and FIG. 2B is a schematic structural side view of the surfing system according to the first exemplary embodiment. As shown in the figures, the present invention provides the wind-water machine set 1 for a ship 10. The wind-water machine set 1 includes: a master control center 11, a propulsion system 12, a surfing system 13, a steering control system 14, a balancing system 15, and a draft reducing system 16. The master control center 11 is located at an inner side of the ship 10. The propulsion system 12 is located at the inner side of the ship 10 and is connected to the master control center 11 for supplying a small amount ultra-high speed of wind-water flows and serving as a power system. The surfing system 13 is located near a bow bottom sea chest 110 of the ship 10 and is connected to the master control center 11 and the propulsion system 12. The surfing system 13 has a plurality of jet acceleration tube 131, 132, and 133 and is capable of pumping water from the bow sea chest 110 of the ship 10 and spraying wind-water from a ship bow to a ship bottom 131, a ship portside 132, and a ship bow to a ship starboard side 133. The steering control system 14 is located at the outer side of the ship 10 and is connected to the master control center 11 to replace a steering engine so that the ship 10 can be manipulated more easily. The balancing system 15 is located at the outer side of the ship 10 and is connected to the master control center 11 to keep the ship 10 in balance without rolling, pitching, and swaying. The draft reducing system 16 is located at the outer side of the ship 10 and is connected to the master control center 11 so that the ship 10 does not require ballast water in most cases and can even float in the air if the ship inner water tank has enough water to eject outward for the ultra-high-speed flow. The wind-water unit can be used in accordance with the needs and options of shipowners and be configured along with preferences, regulatory requirements, uses, routes, cargo, environment . . . etc.

In an exemplary embodiment, the wind-water machine set further includes an air injection tube 17 disposed at a tail end of the ship 10 for eliminating water-resistance at the tail end of the ship caused by high-speed sailing of the ship 10.

The propulsion system 12 has at least one bell mouth or at least one sleeve for reducing an outlet diameter of a water flow, and then spraying and impinging on the water flow one or more times with air, compressed air of various pressures and a high-pressure water-air column to prolong an action time of a counterforce, to spray the wind-water flow backward at an ultra-high-speed, and to obtain maximum propulsion energy.

In an exemplary embodiment, the propulsion system 12 in FIG. 1 serves as a power system to cooperate with the ship 10 to pump water from the sea chest 110 projecting from the bow. The water is framed in the sleeve and is impinged and entrained by compressed air and high pressure spray for one or more times to generate an ultra-high-speed wind-water flow to spray outward in a variable angle through a nozzle at the tail end of the ship, so that water power is amplified by thousands of times, thereby easily achieving high speed and fuel-efficient sailing. At an excessive ship speed, the air injection tubes 17 at the tail end of the ship injects air to prevent a pull force of water-resistance.

In an exemplary embodiment, the propulsion system 12 in FIG. 1 serves as a power system to cooperate with the surfing system 13 in FIG. 2. Water is pumped from the bow sea chest 110 and is sprayed out from the jet acceleration tube 131 combines wind-water flows to flow through the ship bottom. Also, wind-water flows are sprayed out from the two jet acceleration tubes 132 and 133 and combined to flows toward the port side and starboard side to prevent the water flows from impinging on the ship. It can have the water flow in front of the bow of the ship flow to the bottom of the ship or both sides of the ship through the mixing of the water flow from the surf system and the combined flow of the water, so as to avoid the water flow in front of the ship from hitting the hull. Such a surfing system pushes through water-resistance of the ship and is cooperated with the power of the propulsion system 12 using the wind-water machine so that the wind-water flow power of the engine of the ship 10 is amplified, The ship achieves surf sailing in an environment without water resistance, thereby easily achieving ultra-high-speed and ultra-fuel-efficient sailing.

In an exemplary embodiment, referring to FIG. 2A and FIG. 2B, the surfing system 13 functions through utilizing a wind-water machine to spray a high-pressure water-air column out from the bow air injection tube of the jet acceleration tube 131 at a high speed to impinge on water flow in front of the bow to lead the mixing water flow through the ship bottom, to spray a high-pressure water-air column out from the port side air injection tube of the jet acceleration tube 132 at a high speed to impinge on the water flow in front of the bow to lead the mixing air-water flow to the Port side of the ship, and to spray a high-pressure water-air column out from the bow starboard side air injection tube of the jet acceleration tube 133 at a high speed to impinge on the water-air flow in front of the bow to lead the mixing water flow to the starboard side of the ship.

The electric draft sensor controllers are installed on all one or more groups of the inflatable water spray pipes of the control center of the surfing system 13. Only when the load is heavy, the load control switches will automatically open, allowing the jet acceleration tubes to strongly eliminate light load water-resistance. The commonly used jet acceleration tubes under heavy load conditions become a high-pressure jet system to eliminate water-resistance in deep water.

Figure 3A:
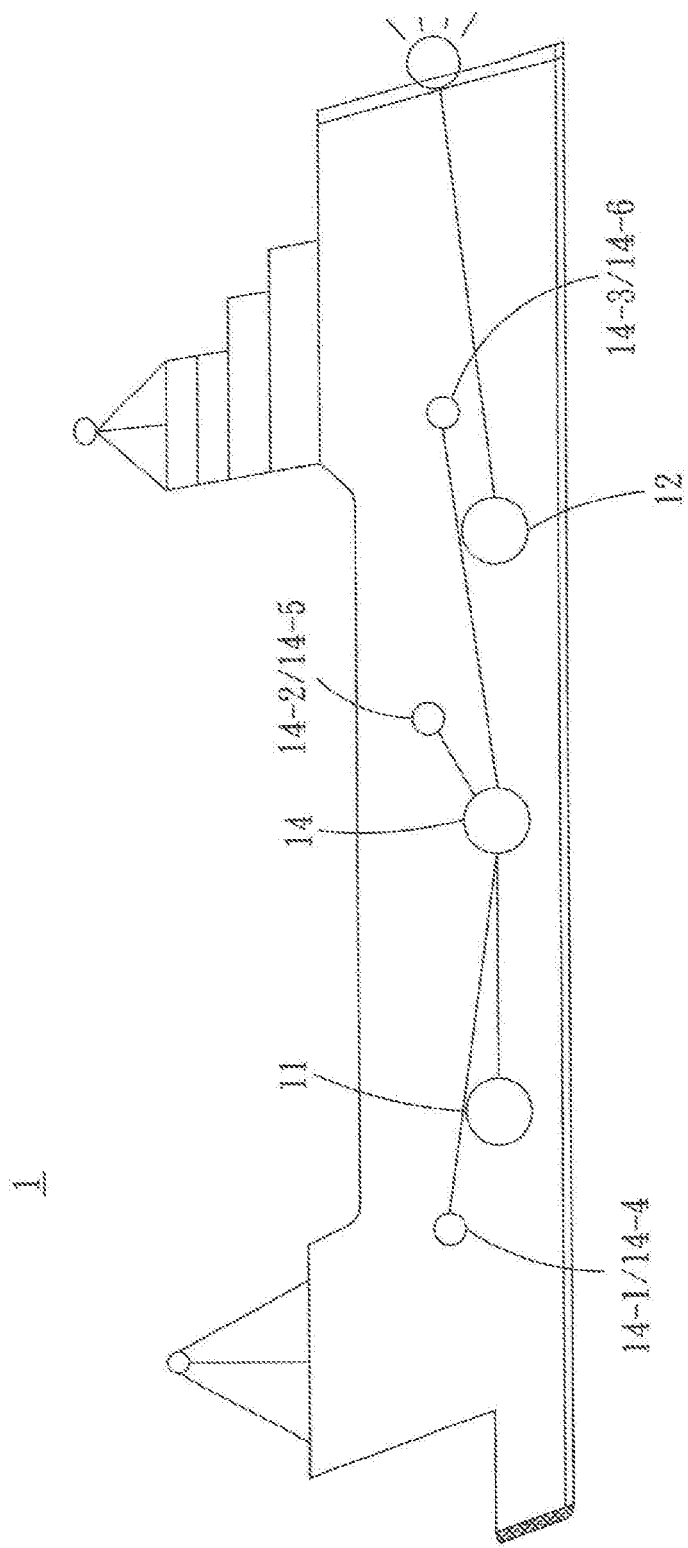
FIG. 3A is a schematic structural side view of a steering control system of the wind-water machine set according to the first exemplary embodiment of the present invention.
Figure 3B:
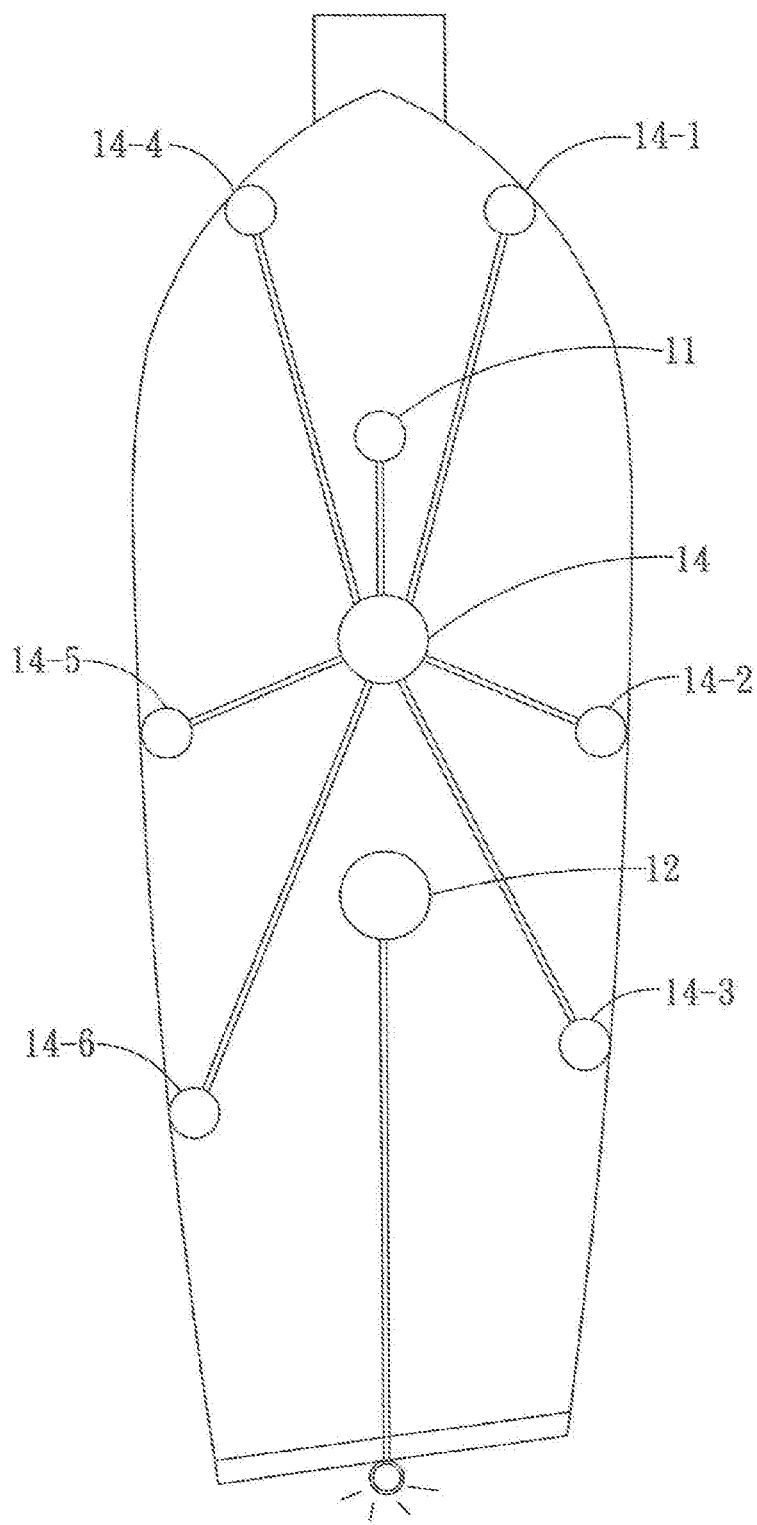
FIG. 3B is a schematic structural overlook view of the steering control system of the wind-water machine set according to the first exemplary embodiment of the present invention.

In an exemplary embodiment, referring to FIG. 3A and FIG. 3B, a control center of the steering control system 14 also functions through the wind-water machine. In addition to the left/right turning and forward/backward movement provided by the propulsion system 12, the present invention further provides a steering control method comprising the following operations. Each nozzle of the wind-water machine turns leftward: (14-1/14-6) is pushed outward; turns rightward: (14-4/14-3) is pushed outward; laterally moves leftward: (14-1/14-2/14-3) is pushed outward; laterally moves rightward: (14-4/14-5/14-6) is pushed outward; turns leftward in the same place: (14-1/14-6) is pushed outward, where the main nozzle of the propulsion system 12 is merely for assistance and turns rightward in the same place: (14-4/14-3) is pushed outward, where the main nozzle of the propulsion system 12 is merely for assistance. In this way, large power obtained by spraying high-pressure water-air at a high speed is used to strongly control the operation of the ship, which ensures the safe operation of the ship at any time.

Figure 4A:
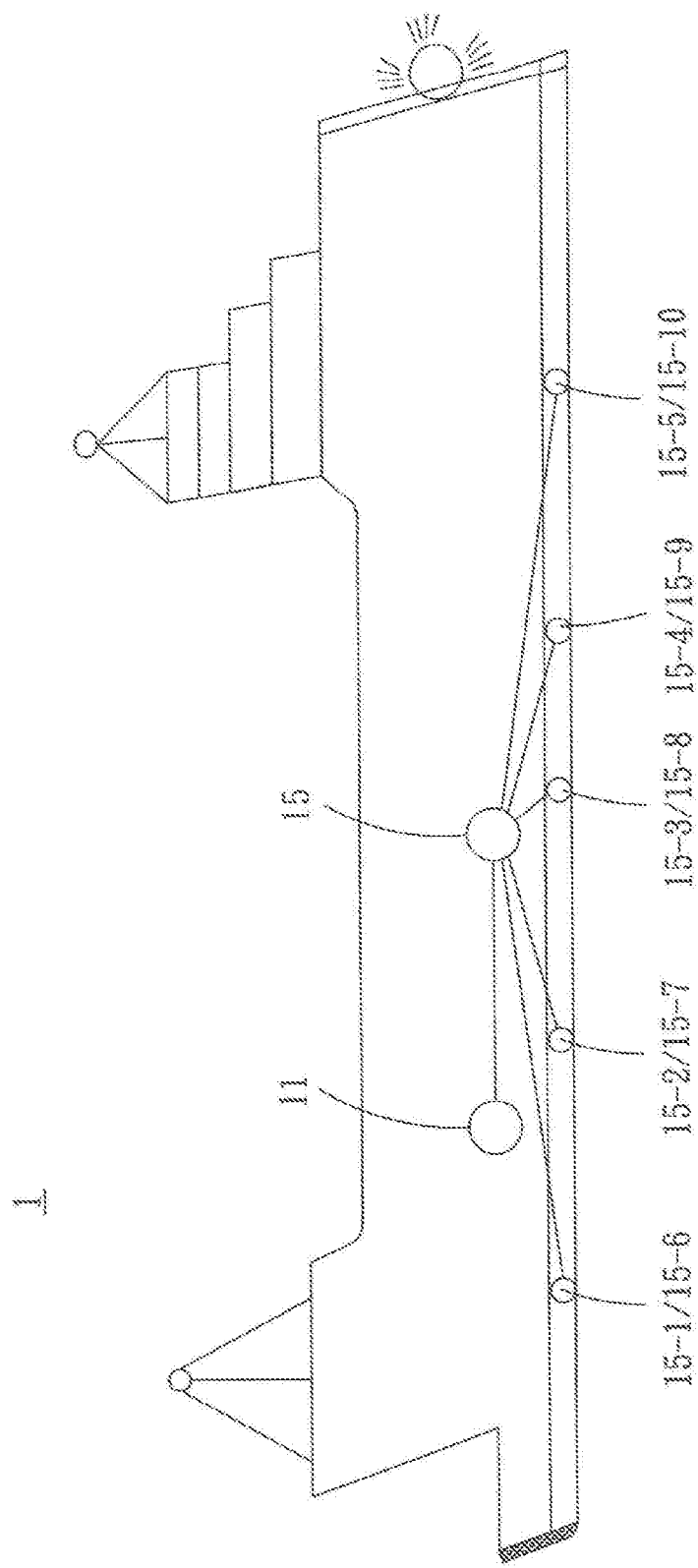
FIG. 4A is a schematic structural side view of a balancing system of the wind-water machine set according to the first exemplary embodiment of the present invention.
Figure 4B:
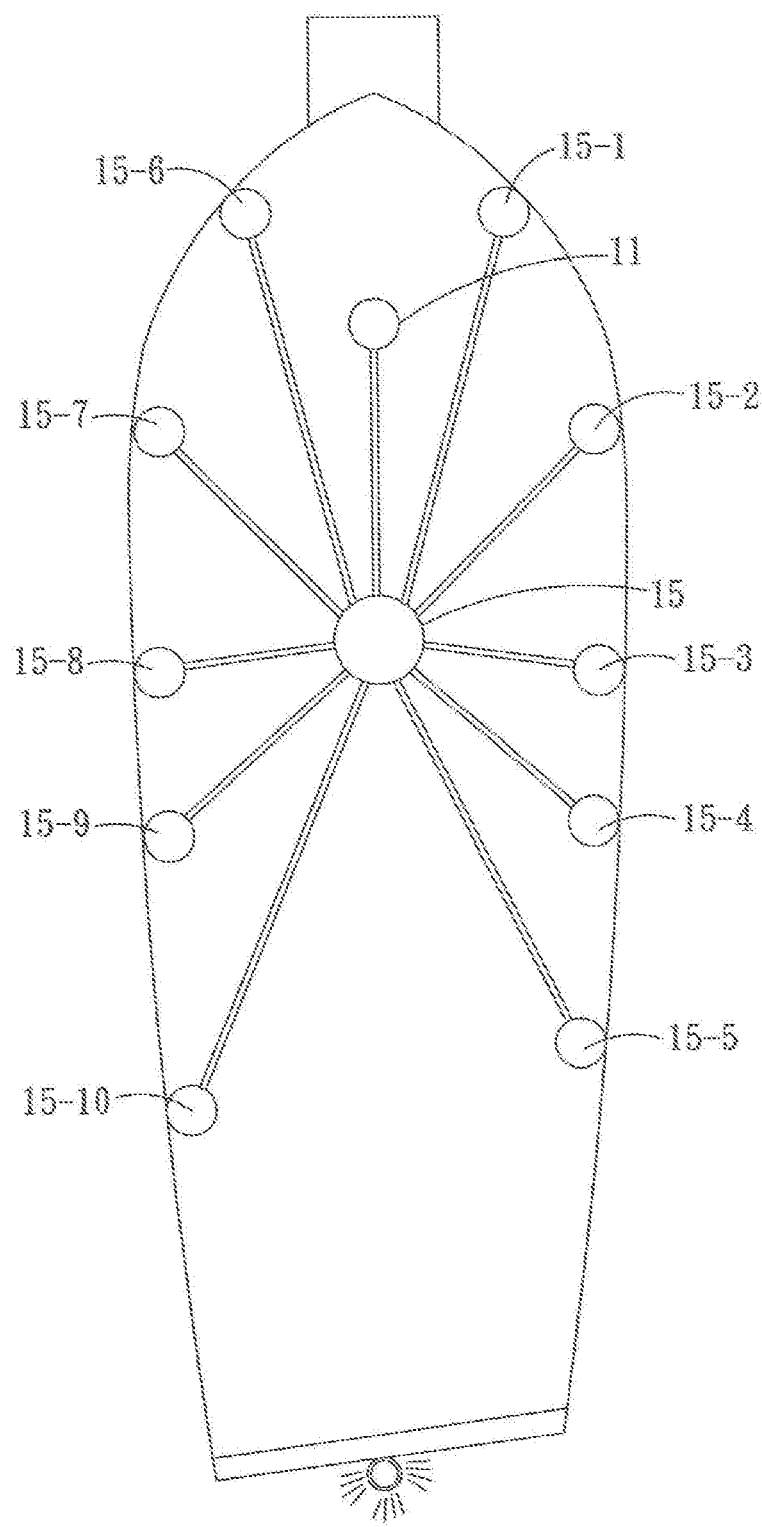
FIG. 4B is a schematic structural overlook view of the balancing system of the wind-water machine set according to the first exemplary embodiment of the present invention.

In an exemplary embodiment, referring to FIG. 4A and FIG. 4B, the balancing system 15 also functions through the wind-water machine. The present invention provides a strong balance maintaining system. A method for control each wind-water machine nozzle includes the following operations. For leftward inclination, (15-6/15-7/15-8/15-9/15-10) is pushed downward; for rightward inclination, (15-1/15-2/15-3/15-4/15-5) is pushed downward; for forwarding nodding: (15-1/15-2/15-6/18-7) is pushed downward; and for backward-looking, up: (15-4/15-5/15-9/15-10) is pushed downward. A swaying degree of the ship may be strongly balanced using only the great power obtained by spraying out high-frequency high-pressure wind-water flow at an ultra-high-speed, which ensures the safety and comfort of the ship at any time.

Figure 5A:
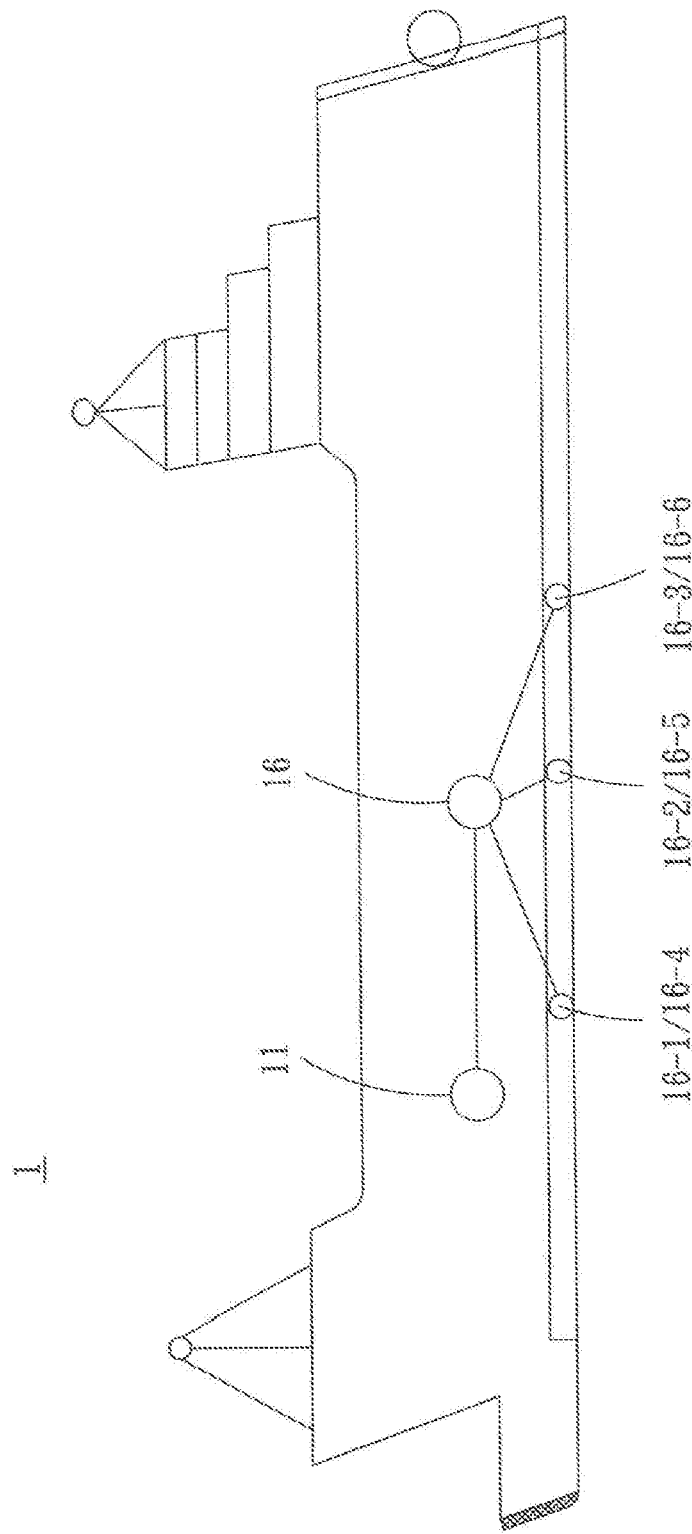
FIG. 5A is a schematic structural side view of a draft reducing system of the wind-water machine set according to the first exemplary embodiment of the present invention.
Figure 5B:
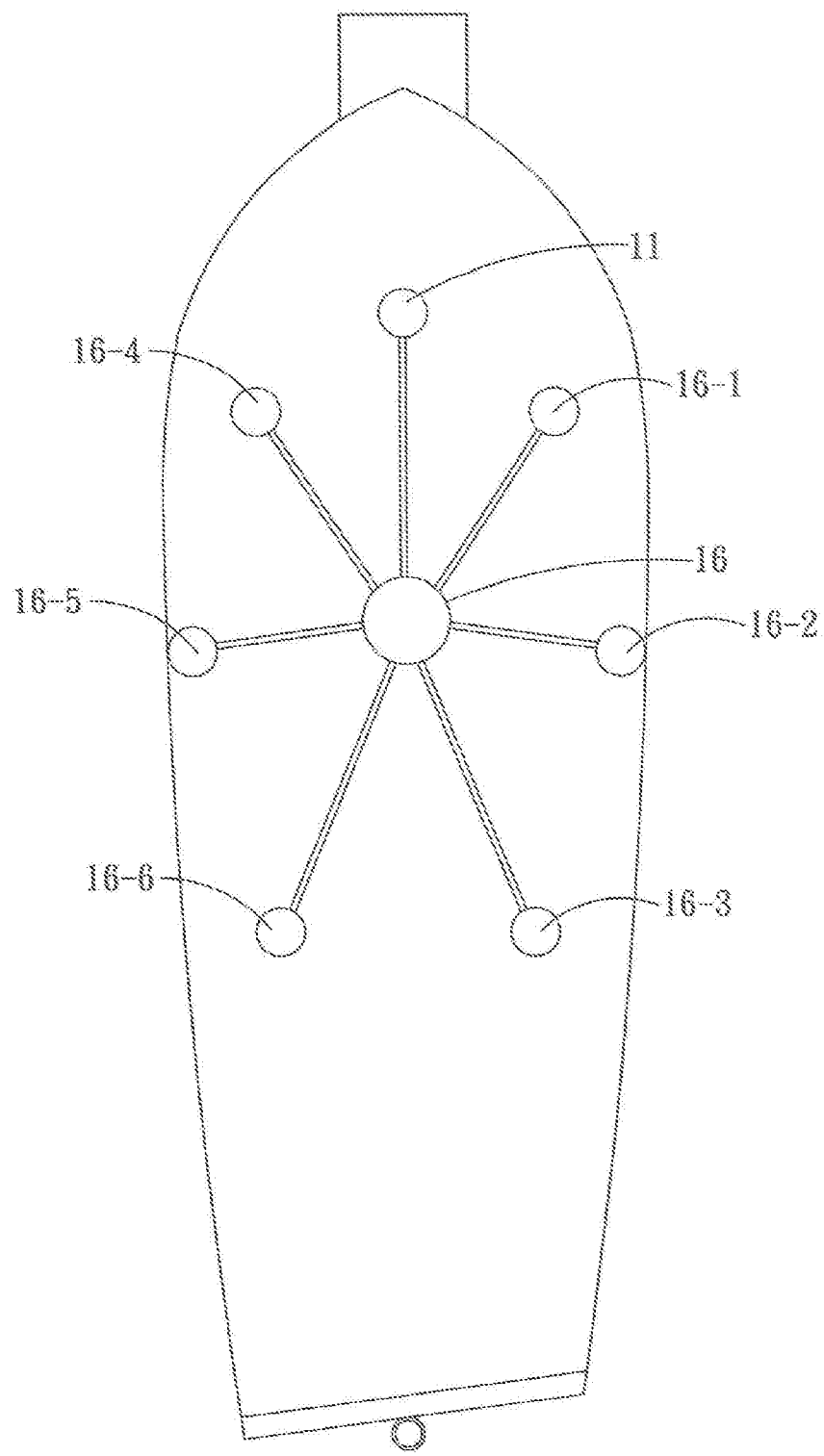
FIG. 5B is a schematic structural overlook view of the draft reducing system of the wind-water machine set according to the first exemplary embodiment of the present invention.

In an exemplary embodiment, referring to FIG. 5A and FIG. 5B, the draft reducing system 16 also functions through the wind-water machine, so that ballast water is not required for the ship 10. A method for control each wind-water machine nozzle includes the following operations. For reducing a draft, (16-1/16-2/16-3/16-4/16-5/16-6) is pushed downward; when the ship inclines rightward, (16-1/16-2/16-3 is pushed with an increased force, and 16-4/16-5/16-6 is pushed with a reduced force); and when the ship inclines leftward, (16-1/16-2/16-3 is pushed downward with a reduced force, and 16-4/16-5/16-6 is pushed downward with an increased force). The draft may be reduced only with our great power, so as to ensure fuel-efficient performance, safety, and comfort of the ship at any time.

Referring to FIG. 3A, FIG. 3B, FIG. 4A, FIG. 4B, FIG. 5A, and FIG. 5B, in an exemplary embodiment, when the control system is used, because the control system has powerful and inexpensive power, the control system can achieve the following. 1. The control system 14 can replace a steering engine so that the ship 10 can be manipulated easily and quickly by most people, including those have not received professional sailing trainings. The control system 14, as illustrated in FIG. 3A and FIG. 3B, strongly rotates in the same place to quickly keep the ship 10 to stably sail at a predetermined route at any time. The control system 14 can laterally move leftward/rightward to maintain a channel to be on an originally determined track after a steep turn, which is shown in the control system 14 in FIG. 3A and FIG. 3B. 2. The control system 15 can keep the ship 10 in upright balance without swaying pitching rolling or overturning during low-speed sailing of the ship, which is shown in the balancing system 15 in FIGS. 4A and 4B. 3. The draft can be reduced without the ballast water in most cases and the ship can even float in the air, which is shown in the draft reducing system 16 in FIGS. 5A and 5B. If the water tank inside the ship had enough water to spray out ultra-high-speed wind-water flows.

The multifunctional combination of the Wind-water engine of the present invention can be called a "typhoon engine", which will make human ships 10 in the future world safe, comfortable, fast, fuel-efficient, and not afraid of typhoons. The operating cost of the ship that utilizes the present invention is not high. The power demand of the ship is about 1 part of the main engine, 50 parts of compressed air, and 80 parts of high-pressure water column, which is about 10,000 parts of the output. The ship is not expensive to build, cheap to operate, and super safe, super-fast, super fuel-efficient and super comfortable.

Figure 6:
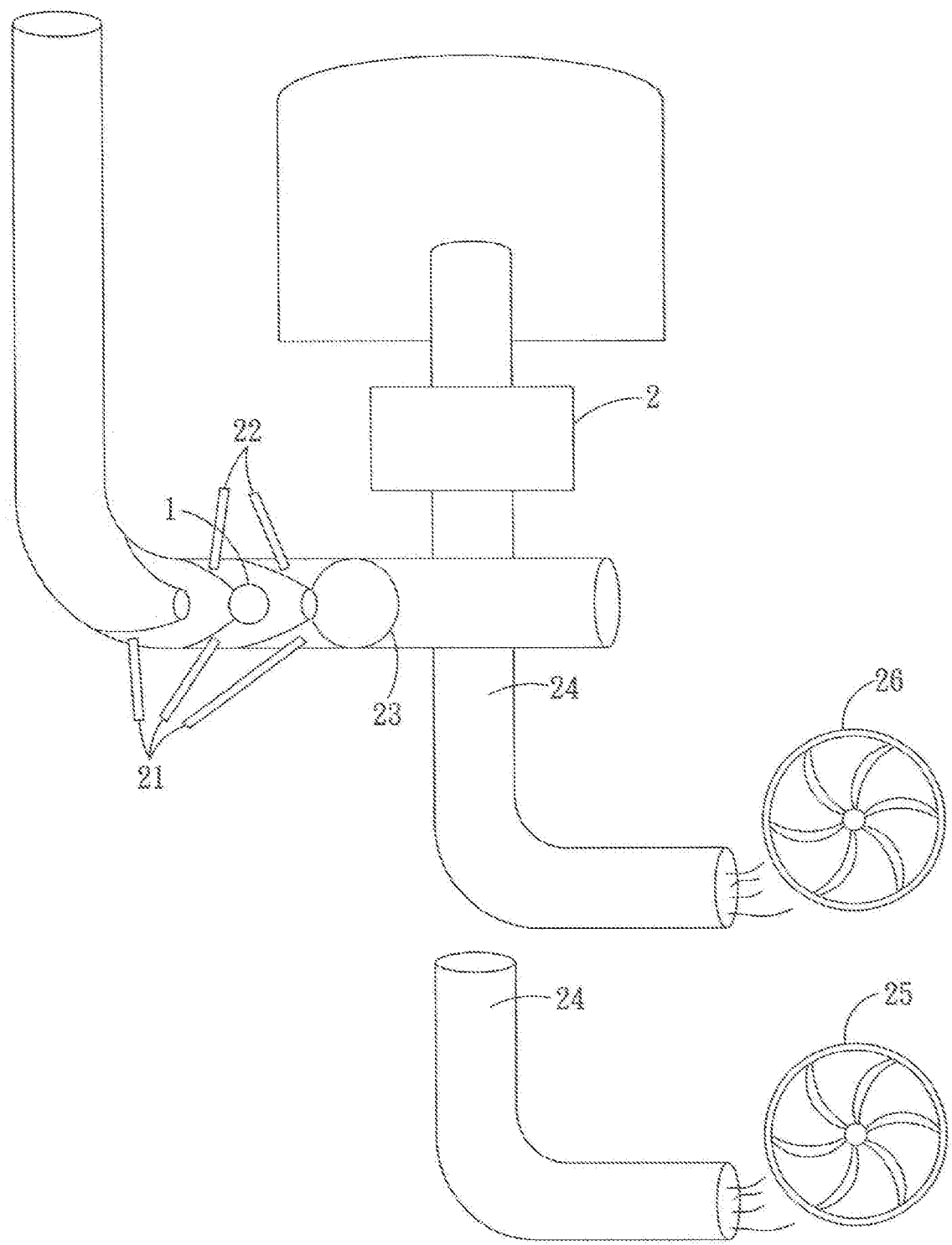
FIG. 6 is a schematic structural plane view of the wind-water machine set for Water-generator according to a second exemplary embodiment of the present invention.

Referring to FIG. 6, in a second exemplary embodiment, a hydroelectric generation system functions through the wind-water machine is provided. Before water flows from a reservoir into the hydroelectric generator, the wind-water machine set 1 of the present invention is inserted. A bell mouth is used to reduce the water volume and increase the outlet pressure and speed. A sleeve is also used to accelerate a water flow speed in the air environment. One or more streams of compressed air 21 or super-high-pressure water spray 22 are used to accelerate the water flow speed through impinging. The water flow impinges on a hydroelectric generator water wheel 23 at a high speed to increase a generating capacity of the hydroelectric generator 2.

The tailwater 24 thereof impinges on an air compressor water wheel 25 to generate compressed air for the wind-water machine use. Another tail-water 24 is used to impinge on a high-pressure water pump wheel 26 to generate a high-pressure water spray column for the wind-water machine use.

The flowchart is as follows. Water flows from the reservoir in the sleeve→The water stream is ejected through the reduced-diameter outlet→The water stream is accelerated by the impact of the compressed air 21 and the high-pressure water sprayer 22→The water stream is again hit by the compressed air 21 and the high-pressure water spray 22→The water stream is again by the compressed air 21 and the high-pressure water spray 22 collided, and accelerated several times in the sleeve→A super-high-speed wind-water column is formed to hit the generator water wheel 23→A tailwater 24 hits the high-pressure water pump wheel 26 or other tailwater 24 hit the air compressor water wheel 25. Since the power generation capacity of the hydro-generator 2 has increased by hundreds of times or more, the generator needs to be changed to have a large capacity to cooperate with the use; or a hundred generator set needs to be added to cooperate with the use.

A low-head water level hydroelectric generator or a small water-flow hydroelectric generator is an extremely good implementation example. A generator which generating capacity is originally small is changed to a generator that outputs a generating capacity increased by hundreds or thousands of times to supply the world with a large amount of clean and cheap generating capacities. Therefore, the earth can be cooled down and the haze will no longer exist, which benefits the world community.

In the wind-water machine set, the propulsion system serves as the power system if a water flow speed is accelerated by dozens of times before a water flow impinges on the electric generator 2, as illustrated in FIG. 6 so that more than one hundredfold power and more than one hundredfold generating capacity output can thereof be obtained. A water flow speed can be accelerated easily in the air environment by above dozens of times to obtain a thousand-fold energy so that the hydroelectric generator can provide a generating capacity thousands of times of current generating capacity. This is extremely suitable for a low-head hydroelectric generator or a sea current/river water flow generator, and the installment can be conducted through upgrade easily, Eventually, it can free the world from the haze. and the earth can be cooled down. Because this relates to human happiness, the inventors dare not stop appealing to take practical actions to provide a better tomorrow for humans and to reach a common prosperity and sharing.

Although the foregoing description and drawings have disclosed the preferred embodiment of the present invention, it needs to be understood that various additions, many modifications, and substitutions may be used in the preferred embodiment of the present invention without departing from the spirit and scope of the inventive principle as defined by the scope of the attached patent application. Those of ordinary skill in the art will appreciate that this creation can be used for modification of many forms, structures, arrangements, proportions, materials, elements, and components. Therefore, the embodiments disclosed herein should be considered to illustrate the present invention, rather than to limit the present invention. The scope of the present invention shall be defined by the scope of the attached claims, and shall cover its legal equivalents, and shall not be limited to the above description.

What is claimed is:

1. A wind-water machine set comprising a propulsion system which has one or more bell mouths and at least one sleeve for reducing an outlet diameter of a wind-water flow to increase a velocity thereof, and spraying and impinging on a wind-water stream one or more times with air, compressed air of various pressures, and a wind-water splash having a predetermined pressure to prolong a reaction force and distance to spray the wind-water flow at a predetermined speed to obtain propulsion energy, wherein the wind-water machine set is applied to a hydroelectric generator, by being inserted in front of the hydroelectric generator, wherein one of the one or more bell mouths and the at least one sleeve is used to reduce a water volume and increase an outlet pressure and speed, wherein the at least one a sleeve is used to accelerate a water flow speed in an air environment, one or more streams of air, compressed air, wherein a water spray having a predetermined pressure is used to accelerate the wind-water flow through impinging, and then a nozzle with a reduced diameter is used to impinge on a hydroelectric generator water wheel at a predetermined speed to increase a generating capacity of the hydroelectric generator, rendering a tailwater thereof impinging on an air compressor water wheel to generate compressed air for the wind-water machine to function, wherein another tailwater is also used to impinge on a water pump wheel having a predetermined pressure to generate a water spray column for the wind-water machine to function.

2. A wind-water machine set for a ship, comprising:
    a master control center, arranged in the ship;
    a propulsion system, connected to the master control center to provide a wind-water flow having a predetermined speed and obtain kinetic energy with a squared flow velocity;
    a surfing system located at a bow and connected to the master control center and the propulsion system, wherein the surfing system has multiple jet accelerator tubes, adapted for pumping water from a sea chest and spraying the wind-water flow from the bow to a bottom, a port side, and starboard sides of the ship for eliminating water resistance from sailing;
    a steering control system located on an outer side of the ship and connected to the master control center for controlling movements of the ship;
    a balance system located on an outside of the ship and connected to the master control center to keep the ship upright and balanced without swaying rolling pitching anytime; and
    a draft reduction system, located on the outside of the ship and connected to the master control center, allowing the ship to eliminate a need for ballast water.

* * * * *